United States Patent Office.

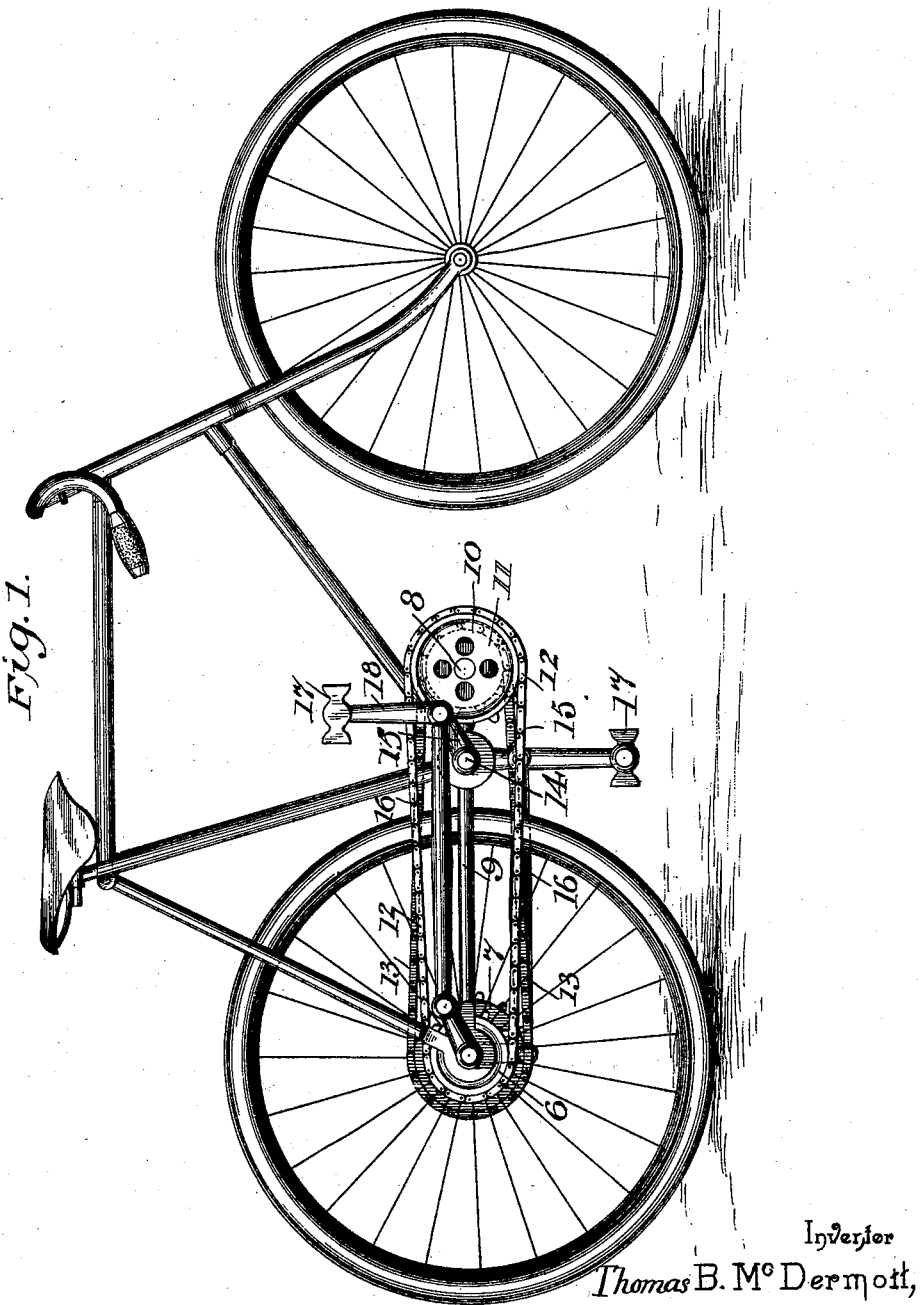

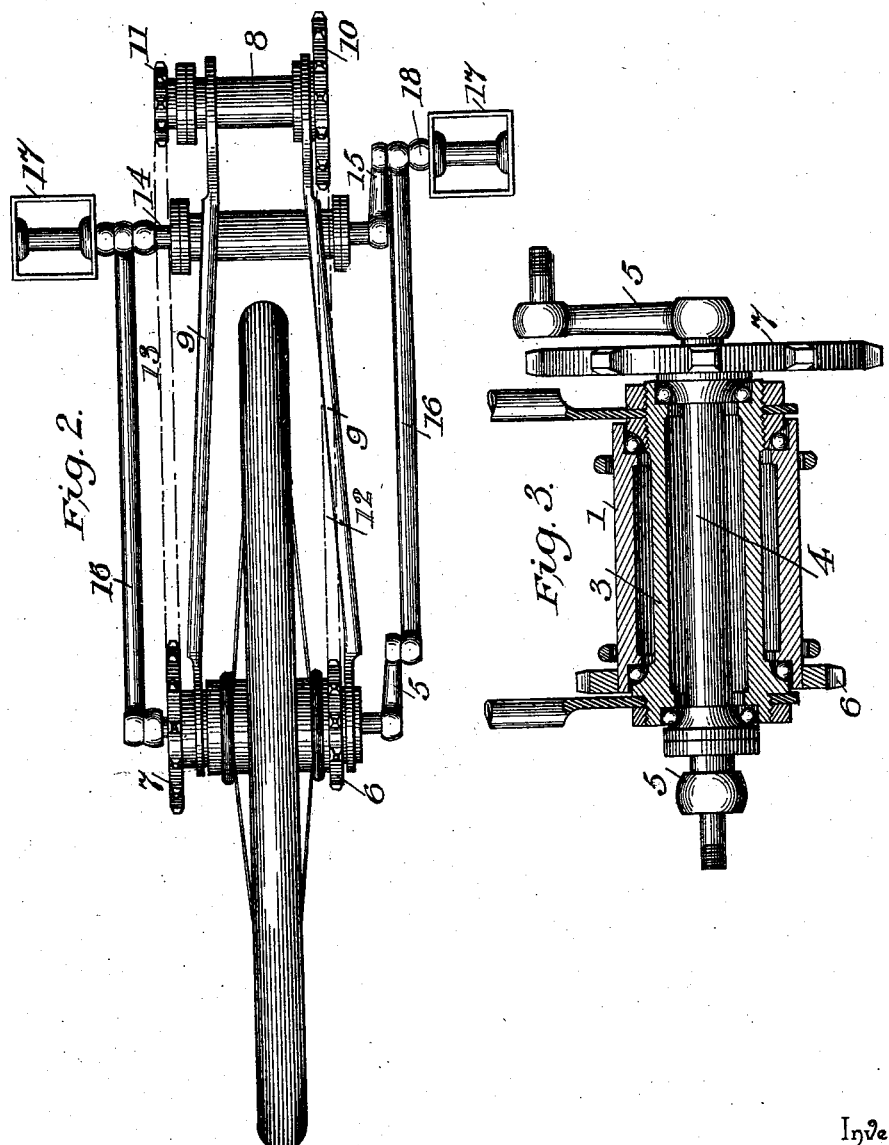

THOMAS B. McDERMOTT, OF PORTLAND, OREGON.

BICYCLE PROPELLING MECHANISM.

SPECIFICATION forming part of Letters Patent No. 603,281, dated May 3, 1898.

Application filed May 26, 1897. Serial No. 638,123. (No model.)

*To all whom it may concern:*

Be it known that I, THOMAS B. McDERMOTT, a citizen of the United States, residing at Portland, in the county of Multnomah and State of Oregon, have invented a new and useful Propelling Mechanism for Bicycles, &c., of which the following is a specification.

This invention relates to driving-gear for bicycles and machines generally propelled by foot-power through the intervention of pedals and a crank-shaft, and has for its object to increase the speed and equalize the driving force and obviate the cranks from stopping on a dead-center, the power-transmitting mechanism being disposed so as to equally distribute the strain and load upon opposite sides of the frame.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a safety-bicycle having the improved propelling mechanism applied thereto. Fig. 2 is a top plan view of the propelling mechanism, showing sufficient of the framework of the machine to illustrate the relation of the parts. Fig. 3 is a vertical longitudinal section of the hub of the drive-wheel.

Corresponding and like parts are referred to in the following description and indicated in the several views of the accompanying drawings by the same reference characters.

The bicycle illustrated is of ordinary construction and demonstrates the practical application of the invention and is shown for this purpose. The hub 1 of the drive-wheel 2 is mounted upon a tubular bearing 3, which is secured at its ends to the frame of the machine and in which is mounted the axle 4, provided at its ends with cranks 5, which are disposed at an obtuse angle relative to each other. Ball-bearings of ordinary construction are interposed between the hub 1 and bearing 3 and between the said bearing and the axle 4 to reduce the friction to a minimum amount. A sprocket-wheel 6 is secured to one end of the hub 1, and a sprocket-wheel 7 of greater diameter is made fast to the end of the axle 4 opposite and remote from the sprocket-wheel 6.

An idle-shaft 8 is journaled in bearings provided in extensions of the lower frame-bars 9 and is provided at one end with a sprocket-wheel 10 and at its opposite end with a sprocket-wheel 11 of smaller diameter than the sprocket-wheel 10. A sprocket-chain 12 connects the sprocket-wheel 10 with the sprocket-wheel 6, and a sprocket-chain 13 connects the sprocket-wheel 11 with the sprocket-wheel 7.

The crank-axle 14 is provided with cranks 15, set relatively at an obtuse angle to each other and connected by pitmen 16 with corresponding cranks 5, whereby power applied to the shaft 14 is transmitted to the axle 4. Pedals 17 have connection with the cranks 15 by means of arms 18 and receive the pressure applied thereto for propelling the machine.

The relative disposition of the cranks 5 and 15 prevents their stopping upon a dead-center, and being connected on each side of the machine by pitmen 16 the strain is equally divided and the power transferred from the crank-axle to the axle 4 to better advantage. The sprocket-wheel 7 being of larger diameter than the sprocket-wheel 11, the shaft 8 will be driven at a higher rate of speed than the axle 4, and the sprocket-wheel 10 being of greater diameter than the sprocket-wheel 6 the drive-wheel will be rotated at a higher rate of speed than the shaft 8. It will thus be seen that the speed of the drive-wheel is considerably greater than the rotation of the crank-axle, to which the initial power is applied for propelling the machine, and the location of the drive-chains 12 and 13 upon opposite sides of the machine equalizes the strain upon the opposite sides of the machine and causes the bearings to wear alike, whereby the machine is caused to run easier, with less wear, and with a minimum expenditure of energy in its propulsion as compared with the relative speed.

Having thus described the invention, what is claimed as new is—

1. In propelling mechanism for bicycles and the like, the combination of a drive-wheel, an axle mounted independently of and concentric with the drive-wheel, a crank-axle, means for connecting the crank-axle with the drive-wheel axle, an idle-shaft provided with differential gearing, and means for connecting the elementary parts of the differential gearing with the drive-wheel and its axle, substantially as set forth.

2. In propelling mechanism for bicycles and the like, the combination of a drive-wheel, an axle mounted independently of and concentric with the drive-wheel and provided at its ends with cranks, a crank-axle, pitmen connecting the cranks at the ends of the crank-axle with the cranks of the drive-wheel axle, an idle-shaft having differential gearing, and independent connections between the component parts of the said differential gearing and the drive-wheel and the drive-wheel axle, substantially as set forth.

3. In propelling mechanism for bicycles and the like, the combination of a fixed tubular bearing, a drive-wheel mounted upon the said bearing, an axle journaled within the tubular bearing and provided at its ends with cranks, a crank-axle, pitmen connecting the arms of the crank-axle with the cranks of the drive-wheel axle, an idle-shaft having differential gearing, and independent connections between the elements of the said differential gearing and the drive-wheel and its axle, substantially as described.

In testimony that I claim the foregoing as my own I have hereto affixed my signature in the presence of two witnesses.

THOMAS B. McDERMOTT.

Witnesses:
MAURICE J. DANAHER,
JOHN J. SMITH.